Patented July 18, 1950

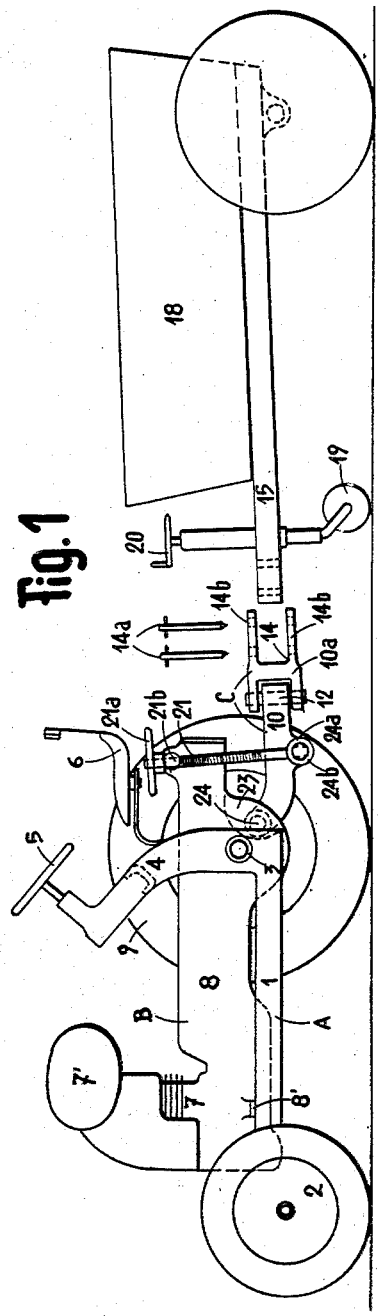
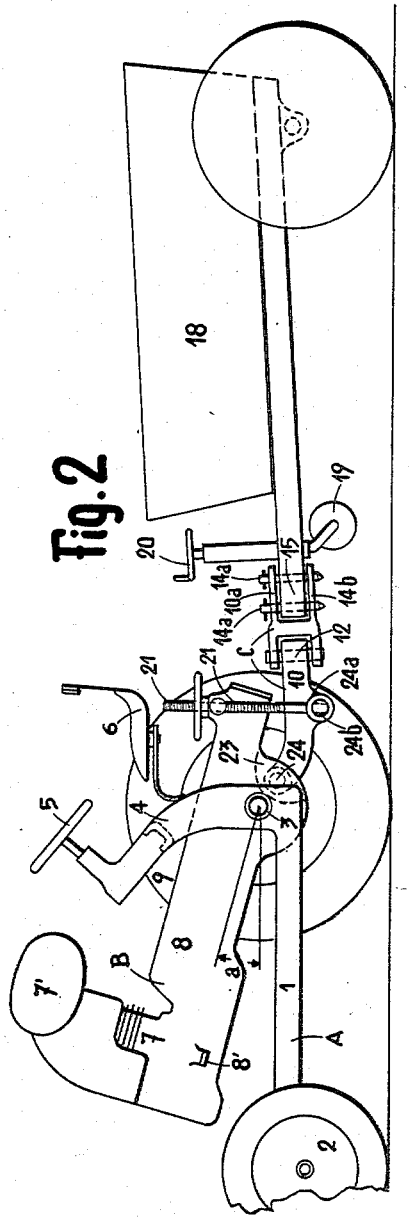

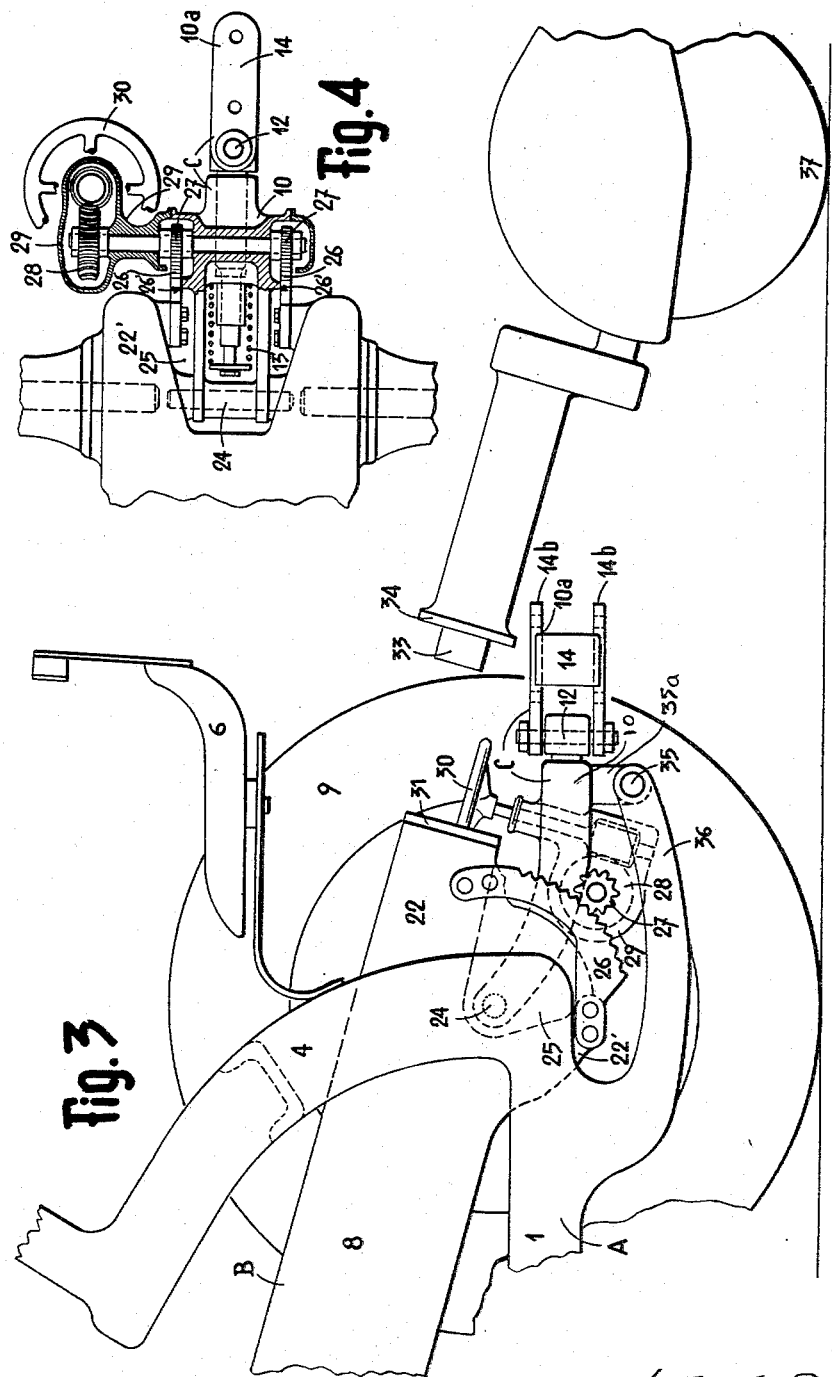

2,515,991

UNITED STATES PATENT OFFICE 2,515,991

COUPLING MECHANISM FOR CONNECTING THE REAR END OF A TRACTOR MOUNTED POWER PLANT TO A TRAILER DEVICE

Leon Dufour, Geneva, Switzerland

Original application April 18, 1944, Serial No. 531,636. Divided and this application July 19, 1948, Serial No. 39,388. In Switzerland May 10, 1943

6 Claims. (Cl. 180—11)

The present invention relates generally to tractors and more particularly to tractors consisting of a duplex chassis, such as described and claimed in my co-pending application, Serial No. 531,636, filed April 18, 1944, which became Patent No. 2,475,825, July 12, 1949, and of which this application is a division.

In my prior application there is shown broadly a tractor with a two part chassis. The first part carries the ground-engaging wheels and the second part carries the power plant of the tractor, including the motor, gear box, etc. This power plant portion or second part is turnable around the rear drive axle of the ground engaging first part to provide for weight distribution around the rear drive axle by tilting action applied to the said second part. Also extending from the second part is a rigid coupling section adapted to be coupled to the tongue of a trailer formed with a cooperating coupling, all of which when coupled together are rigid in a vertical plane.

It is an object of the present divisional application to provide novel means for turning the power plant portion or second part of the tractor on the rear drive axle of the tractor, to thereby position the rigid coupling member of this second part of the tractor into coupling position with respect to the tongue of the trailer or other device to be coupled therewith.

For example, in my prior co-pending application, to couple the trailer tongue to the rigid coupling of the tractor power plant portion, it is necessary to lift the power plant by means of lifting mechanism bearing against the front wheels or against the ground. Then after coupling the trailer to the rigid coupling of the tractor, it is necessary to withdraw this mechanism in order to permit the tractor to proceed under its own power. However, the present invention gives a simple solution to this problem.

The principal object of the present invention is to provide lifting mechanism for tilting the second part carrying the power plant with respect to the ground-engaging first part of the tractor, to whereby not only facilitate coupling and uncoupling of the second part to the tongue of a trailer or like vehicle, but to also retain the said second part in adjusted angular position with respect to the first part to impart greater weight to the drive wheels and increase adherence thereof to the ground.

With the above and other objects in view, the invention consists in the construction, arrangement and combination of parts hereinafter described and particularly pointed out in the claims.

In the drawings, like parts throughout the several views are given like numerals and are thus identified in the following detailed description:

Figure 1 shows a side view of an example of a lifting mechanism and coupling bar before hooking up or coupling to a trailer vehicle or implement.

Fig. 2 represents the same detail after coupling and adjustment of the lifting mechanism.

Fig. 3 shows another form of lifting mechanism and coupling-bar about to be coupled with an agricultural roto-tiller.

Fig. 4 shows a plan view and section of the lifting mechanism and coupling bar represented in the side view of Figure 3.

All figures are shown schematically and in all of them the left-hand rear driving wheels have been omitted in order to increase the clarity of the drawing.

In both forms of the invention the tractor chassis consists of two hingedly or pivotally connected parts designated generally as A and B; the main part or frame A being conveniently considered fixed relative to the normal plane of travel of the tractor while the auxiliary hinged part B, which carries the power plant assembly, is angularly movable relative thereto when the tractor is in draft relation to a trailer vehicle or implement, or, according to one form of the invention may be placed in predetermined angular relation by means adjustably interconnecting the rear of the power plant assembly and the front section of the coupling.

Referring in detail to the drawings and first with particular reference to Figures 1 and 2, there is shown a coupling bar C, including a front section 10 and a rear section 10a. The front section 10 is pivoted on an axis 24. It suffices to articulate the part 10 of the coupling bar C for vertical movement around the horizontal axis 24 arranged in a parallel relation with the axle 3 of the rear wheels 9 of the tractor, this axis 24 being very close to the said axle or even coinciding with the same, and to connect said coupling bar C to the hinged part B of the tractor through regulating means, such for example as a screw-mechanism 21, preferably non-reversible, connecting this compound coupling bar C to an extension 22 towards the rear of the hinged part B.

In order to attach a trailer vehicle, such as a cart 16 to the tractor, the hinged part B will at first be left to rest upon its chassis or fixed part A, while the screw-mechanism 21 will be so adjusted that the notched or forked part 10a of the rear of the compound coupling bar C is at the same level as the tongue 15 of the cart 18 and aligned with same, as shown in Fig. 1. It will be noted from this figure that the hinged part B bears against the chassis 1 of the fixed tractor part A through the support 8' forming part of the gear box 8. The coupling bar C may then be connected with the tongue of the cart, whereby it will be eventually necessary to continue to adjust the height of the coupling bar in order to facilitate this operation. It should be noted, that the longitudinal axis through the coupling bar C and the tongue 15 is not necessary horizontal, but may have a more or less oblique (slanting) position as shown in Figures 1 and 2. The coupling operation having been accomplished, the screw-mechanism 21, anchored to the coupling bar C through section 10 now rigidly connected to the tongue 15 of the cart, will be operated in such a manner by turning hand wheel 21a as to move in a downward direction the rear extension 22 of the hinged part B of the tractor, at the same time lifting the motor 7 and the gear box 8 to the desired position, forming the tilting angle a, Fig. 2, with the original rest position, Fig. 1.

The hinged part lifting mechanism generally referred to above as "the screw-mechanism 21," comprises screw threaded shaft with a hand wheel 21a keyed to its upper end. This screw shaft 21 threads through a lug 21b formed from the side of extension 22 when the hand wheel is turned. The lower end of the screw shaft 21 is pivotally connected at 24a around a lug 24b formed in coupling bar part 10 carried by the rear end of the power plant.

It will be noted from the two Figures 1 and 2, that in order to articulate the front end 10 of the coupling bar C around the axis 24 forming part of the hinged part B of the tractor and being placed very close to the axle of the wheels, a recess 23 must be provided in the body of the hinged part B of the tractor as shown by dotted lines in the aforementioned two drawings.

In addition to the embodiment shown and described in connection with the first two figures of the drawings, there is illustrated another embodiment in Figures 3 and 4.

If it is desired to have the axis 24 coincide with the axle of the rear wheels, a still much bigger recess 25 must be provided in the body of the hinged part B of the tractor as is shown as a matter of example in the Figures 3 and 4. These figures show an alternative design of the mechanism for tilting the hinged part B of the tractor with respect to the coupling bar C. In this alternative form two toothed sectors 26 are fastened to either side of the extension 22 of the hinged part B and to either side of the lower part 22' of the rear end of the gear-box, their center coinciding with the articulation axis 24 of the coupling bar C. These two sectors engage with two pinions 27 mounted on a single shaft, the bearings of the latter being fixed to the coupling bar front section 10. In Figure 3 only the left-hand sector and pinion are shown. A worm-gear 28, indicated by a dotted circle in the interior of its housing 29, is keyed to the shaft carrying the two pinions 27 and is driven by means of a worm 28 of preferably non-reversible design connected to a hand wheel 30. The pinions 27, their shaft and the housing 29 forming part of the coupling bar front section 10, make it possible to tilt the hinged part B of the tractor, provided the coupling bar C, is fastened to the tongue 15 of a cart 18, in exactly the same manner as shown in Figure 2. The two toothed sections 26 may at the same time serve as lateral guides for the front section 10 of the coupling bar C as indicated in 26' in Fig. 4, since the said coupling bar must be able to resist the side-thrust during turns.

In certain cases it will be an advantage to be able to tilt the hinged part B of the tractor, even when the coupling bar C is not connected to the tongue 15 of the cart 18 or of the drawn vehicle. Such is the case for example, when it is desired to attach certain tools such as a rotating cultivator (rota-tiller) to the flange 31 attached to the rear end 22 of the hinged part B of the tractor, this flange 31 containing a rotative lock (Fig. 3). To these ends, the chassis 1 of the tractor is lengthened beyond the axle of driving wheels by means of an arm 36 to the end of which an apertured lug 35a of the coupling bar portion 10 may at times be anchored by a pin 35. If the mechanism 27, 28, 30 is operated under these conditions, the hinged part of the tractor is tilted upwards because of the force acting in an upward direction upon the pin 35 in lug 35a and the arm 36. It is thus possible to lower the flange 31 fixed to the rear 22 of the hinged part of the tractor and to couple without difficulty the pin 33 and the flange 34 of the implement, the latter forming some kind of a cylinder and bearing against the ground at 37. This method avoids need of having to lift the always very heavy roto-tiller above ground-level in order to be able to couple same to the rear of the tractor. After the coupling operation is accomplished the pin 35 is withdrawn in order to liberate again the hinged part B of the tractor to the rear end of which is attached the implement. The sequence of operations is reversed for uncoupling the roto-tiller from the tractor.

While only two embodiments of the present invention are illustrated, it is to be expressly understood that various constructions and arrangements of the parts may now be resorted to by others skilled in the art without departing from the scope of the present invention. To determine the scope of the present invention, reference should be had to the appended claims.

What is claimed is:

1. In a tractor having a chassis consisting of a wheeled frame including rear drive wheels and a power plant assembly movably mounted on an axis coinciding with the axis of said rear drive wheels, a draft coupling for a trailer device, said coupling comprising; a front section, a rear section, a vertical pivot joining the inner ends of said sections, means for pivotally connecting the front section to the movable power plant assembly, means for rigidly connecting in a vertical plane the rear section to a trailer device, and means for interconnecting the power plant assembly and the front section of the coupling to maintain the same in selected angular relation when the rear section is connected with a trailer device, to thereby impart greater weight to the drive wheels and increase adherence thereof to the ground.

2. A tractor having a chassis including a wheeled frame having rear drive wheels, and a power plant assembly provided at its front end with means for resting on said frame and provided at its rear end with means for swingably mounting the same coaxially with the axis of the said rear drive wheels of the tractor, and a draft coupling for a trailer device, said coupling comprising: a front section engaged with the rear of the power plant assembly, a rear section having means for rigidly connecting in a vertical plane with a trailer device, a vertical pivot for articulating the inner end of said sections, and means for adjustably connecting the front section of the coupling with the rear end of the power plant assembly when the rear section of the coupling is connected to a trailer device thereby to vary the angle of said power plant assembly relative to the frame and the front section of the coupling and shift the weight of said power plant assembly to the axle for the rear drive wheels, whereby there is an increased adherence thereof to the ground.

3. A tractor having a chassis including a wheeled frame having rear drive wheels, and a power plant assembly provided at its front end with means for resting on said frame and provided at its rear end with means for swingably mounting the same on the axle of the said rear drive wheels of the tractor, and a draft coupling for rigidly connecting in a vertical plane a trailer device, said coupling comprising: a rear section articulated with a front section pivotally connected at its front end to the rear end of the power plant assembly, means for adjustably connecting the front section of the coupling to the rear end of the power plant assembly including a screw shaft pivoted at its lower end to said front section, and a hand-wheel operated nut device carried by the rear end of the power plant assembly and engaging said screw shaft, whereby, the turning of said nut device on the shaft varies the angular relation of the rear end of the power plant assembly and the front section of the coupling when the rear section of the coupling is connected to a trailer device.

4. A tractor having a chassis including a wheeled frame having rear drive wheels, and a power plant assembly provided at its front end with means for resting on said frame and provided at its rear end with means for swingably mounting the same coaxially with the axis of the said rear drive wheels of the tractor, and a draft coupling for rigidly connecting a vertical plane, a trailer device, said coupling comprising: a front section, a rear section, a vertical pivot pin connecting the inner ends of said sections, said front section being pivotally mounted coaxially with the axis of the rear drive wheels of the chassis frame, a pair of toothed sectors carried by the rear end of the motor assembly, said sectors being formed on an arc whose center coincides with the axis of the rear drive wheels of the tractor, a pair of pinions engaging said sectors, a shaft for said pinions journaled in the front section of the coupling, and hand-operated gear means also carried by the front section of the coupling for operating said shaft, whereby rotation of the said shaft and pinions will cause the pinions engaging said sectors to vary the angular relation of the front section of the coupling and the rear end of the power plant assembly when the rear section of the coupling is connected with a trailer device.

5. In a tractor having a chassis consisting of a wheeled frame including rear drive wheels and a power plant assembly movably mounted on an axis coinciding with the axis of said rear drive wheels, a draft coupling for a trailer device, said coupling comprising: a front section, a rear section, a vertical pivot joining the inner ends of said sections, means for pivotally supporting the forward end of the front section coaxially with the axis of the rear drive wheels, means for rigidly connecting in a vertical plane the rear section to a trailer device, means for adjustably interconnecting the power plant assembly and the front section, and means for anchoring the front section of the coupling to a fixed part of the chassis while the rear section of the coupling is disconnected from a trailer device.

6. In a tractor having a chassis consisting of a wheeled frame including rear drive wheels and a power plant assembly movably mounted on an axis coinciding with the axis of said rear drive wheels, a draft coupling for a trailer device, said coupling comprising; a front section, a rear section, a vertical pivot joining the inner ends of said sections, means for pivotally supporting the forward end of the front section coaxially with the axis of the rear drive wheels, means for rigidly connecting in a vertical plane the rear section to a trailer device, and means for adjustably interconnecting the power plant assembly and the front section, and means for anchoring the front section of the coupling to a fixed part of the chassis to permit said last-named means to vary the angular relation of the rear end of the power plant assembly and front section of the coupling while the rear section of the latter is not connected with a trailer device, said means comprising a rearwardly extending arm on the frame of the chassis having an opening at its rear extremity and a depending portion of the front section of the coupling also having an opening adapted to register with the first-mentioned opening, and a pin insertable in said openings when in registry.

LEON DUFOUR.

REFERENCES CITED

The following references are of record in the file of this patent:

UNITED STATES PATENTS

| Number | Name | Date |
|---|---|---|
| 1,408,895 | Lamoreaux et al. | Mar. 7, 1922 |
| 2,035,150 | Dufour | Mar. 24, 1936 |
| 2,429,711 | Dufour | Oct. 28, 1947 |